(12) United States Patent
Li et al.

(10) Patent No.: US 11,783,517 B2
(45) Date of Patent: Oct. 10, 2023

(54) IMAGE PROCESSING METHOD AND TERMINAL DEVICE, AND SYSTEM

(71) Applicant: Huawei Technologies Co., Ltd., Shenzhen (CN)

(72) Inventors: Kang Li, Shenzhen (CN); Jun Liang, Shenzhen (CN); Liang Cheng, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 89 days.

(21) Appl. No.: 17/433,199

(22) PCT Filed: Feb. 13, 2020

(86) PCT No.: PCT/CN2020/074984
§ 371 (c)(1),
(2) Date: Aug. 23, 2021

(87) PCT Pub. No.: WO2020/168964
PCT Pub. Date: Aug. 27, 2020

(65) Prior Publication Data
US 2022/0148234 A1     May 12, 2022

(30) Foreign Application Priority Data
Feb. 22, 2019   (CN) .......................... 201910133543.3

(51) Int. Cl.
*G06T 11/00*   (2006.01)
*G06T 11/40*   (2006.01)
(Continued)

(52) U.S. Cl.
CPC ........ *G06T 11/001* (2013.01); *G06F 3/04817* (2013.01); *G06T 11/40* (2013.01); *G06T 11/60* (2013.01)

(58) Field of Classification Search
CPC ........ G06T 11/001; G06T 11/40; G06T 11/60; G06T 7/11–13; G06T 5/001; G06T 5/006; G06T 5/008; G06T 3/4007; G06T 15/50; G06T 15/503; G06T 15/506; G06T 2207/00; G06T 2207/10024; G06T 2207/20192; G06T 7/70; G09G 5/02; G09G 5/026; G09G 5/10; G09G 5/30; G09G 5/377; G09G 2320/02; G09G 2320/0233; G09G 2320/06; G09G 2320/0626; G09G 2320/0666; G09G 2320/0276;
(Continued)

(56) References Cited

U.S. PATENT DOCUMENTS 10,970,918 B2 * 4/2021 Li .................... G06T 15/506
2013/0201204 A1   8/2013 Li
(Continued)

FOREIGN PATENT DOCUMENTS

CN   101582077 B   6/2011
CN   102622214 A   8/2012
(Continued)

*Primary Examiner* — Wesner Sajous
(74) *Attorney, Agent, or Firm* — Conley Rose, P.C.

(57) ABSTRACT

An image processing method includes obtaining a reflective picture, superimposing the reflective picture on an icon, and changing a color value of at least one pixel in a part that is of the reflective picture and that overlaps the icon.

18 Claims, 13 Drawing Sheets

(51) Int. Cl.
*G06T 11/60* (2006.01)
*G06F 3/048* (2013.01)
*H04N 1/60* (2006.01)
*H04N 5/57* (2006.01)
*G09G 5/02* (2006.01)
*G06F 3/04817* (2022.01)

(58) Field of Classification Search
CPC ...... G09G 2340/10–12; G09G 2360/14; G06F 3/048; G06F 3/4081; G06F 3/04817; G06F 3/0484; G06F 3/04845; G06F 3/0487; A63F 13/52; A63F 2300/66; H04N 1/60; H04N 1/58; H04N 1/6027; H04N 1/6041; H04N 1/6091; H04N 5/445; H04N 5/57; H04N 5/58; H04N 9/64; H04N 9/646; H04N 9/69; H04N 9/73; H04N 9/74–9/77
USPC ........................................................ 345/589
See application file for complete search history.

(56) References Cited

U.S. PATENT DOCUMENTS

| | | |
|---|---|---|
| 2015/0205505 A1 | 7/2015 | Conn et al. |
| 2017/0364241 A1 | 12/2017 | Qian et al. |
| 2018/0272788 A1* | 9/2018 | Bleiman ................ B42D 25/45 |
| 2020/0193694 A1* | 6/2020 | Li ............................ G06T 15/50 |
| 2022/0129076 A1* | 4/2022 | Bernstein ................ G06F 3/016 |
| 2022/0237979 A1* | 7/2022 | Rich .................... B42D 25/378 |

FOREIGN PATENT DOCUMENTS

| | | |
|---|---|---|
| CN | 105426079 A | 3/2016 |
| CN | 105955733 A | 9/2016 |
| CN | 107544730 A | 1/2018 |
| CN | 108701372 A | 10/2018 |
| CN | 109976846 A | 7/2019 |
| WO | 2016138620 A1 | 9/2016 |

* cited by examiner

IMAGE PROCESSING METHOD AND TERMINAL DEVICE, AND SYSTEM

This application is a National Stage of International Patent Application No. PCT/CN2020/074984 filed on Feb. 13, 2020, which claims priority to Chinese Patent Application No. 201910133543.3 filed on Feb. 22, 2019. Both of the aforementioned applications are hereby incorporated by reference in their entireties.

TECHNICAL FIELD

This application relates to the field of image processing, and in particular, to an image processing method and terminal device, and a system.

BACKGROUND

An icon is used to indicate software or an application to a user. In a process in which the user performs human-machine interaction with a terminal such as a mobile phone or a computer, the user clicks the icon by using a mouse or a finger to open the software or the application. The icon is a user's first impression of the software or the application, and has great impact on promotion of the software or the application.

Currently, the icon is mainly static, that is, the icon is displayed as a still picture on the terminal. More vendors propose dynamic icon solutions. However, dynamic icons in the solutions are generally used in applications such as a calendar and a clock, where icon statuses such as time and a date are refreshed at a specific interval according to the solutions. For example, on an iPhone, a home screen clock icon changes with time. For another example, on a Huawei phone, a calendar icon changes with a date.

The dynamic icon is mainly applied to the software or the application such as the calendar or the clock. There is no dynamic icon solution for common software or a common application.

SUMMARY

Embodiments of this application provide an image processing method and terminal device, and a system, to enable an icon to display a dynamic effect.

A first aspect of this application provides an image processing method, including:

obtaining a reflective picture, superimposing the reflective picture on an icon, and changing a color value of at least one pixel in a part that is of the reflective picture and that overlaps the icon, to enable the icon to display a dynamic effect. Optionally, the reflective picture is a semitransparent picture. In this case, the dynamic effect of the icon may be implemented when the icon is displayed.

In some possible implementations, the method for obtaining a reflective picture includes:

creating a fully transparent picture, setting at least one target point in the fully transparent picture, setting a color value of the at least one target point, and determining a color value of a remaining pixel in the fully transparent picture based on the color value of the at least one target point, to create a reflective picture with a gradient effect, where a reflective picture with a better effect should be a picture that does not affect recognition of an icon and has relatively rich colors, for example, a picture with a gradient effect.

In some possible implementations, the determining a color value of a remaining pixel in the fully transparent picture based on the color value of the at least one target point includes:

dividing the fully transparent picture into a plurality of triangles by using the at least one target point, and for any point G in the fully transparent picture, calculating a color value of the point G based on color values of three points of a triangle in which the point G is located.

It should be noted that the fully transparent picture is divided, by using four corners of the picture and the at least one target point, into a plurality of triangles that do not overlap each other, and then a color value of any point in the fully transparent picture is calculated based on color values of three corners of a triangle in which the point is located, so that a color value of any non-target point in the picture should be closer to a color value of a target point when the any non-target point is closer to the target point, and color values of any two points are closer when the any two points are closer. In this way, the reflective picture with the gradient effect is obtained through calculation.

In some possible implementations, the calculating a color value of the point G based on color values of three points of a triangle in which the point G is located includes:

separately connecting the point G to the three points of the triangle, to divide the triangle into three parts, and calculating the color value of the point G according to the following formula: $G = C1 \times g1/g + C2 \times g2/g + C3 \times g3/g$, where G represents the color value of the point G, g1, g2, and g3 respectively represent areas of the three parts of the triangle, and g represents an area of the triangle.

In this way, when the point G is close to a point, a proportion of an area of a relative part of the point to the area of the triangle C1-C2-C3 is used as a proportion of impact of a color value of the point on the point G. In this case, when the point G is closer to the point, impact of the point on the color value of the point G is greater, and the color value of the point G is closer to the color value of the point.

In some possible implementations, both an edge of the reflective picture and an edge of the icon are rectangular, and a length and a width of the edge of the reflective picture are respectively greater than a length and a width of the edge of the icon. In this case, the icon may be completely placed in the reflective picture, to implement impact of the reflective picture on the icon, so as to implement the dynamic effect of the icon.

In some possible implementations, the changing a color value of at least one pixel in a part that is of the reflective picture and that overlaps the icon includes: changing a location of the icon in the reflective icon. Because the reflective picture is gradient, when the location of the icon in the reflective picture changes, the icon is at a different location in the reflective picture, and a color value of the different location in the reflective picture may be displayed on the icon, to implement the dynamic effect of the icon.

In some possible implementations, before the changing a location of the icon in the reflective icon, the method further includes:

obtaining sensing information, and determining the location of the icon in the reflective icon based on the sensing information, so that a terminal device may obtain the sensing information, perform information processing on the sensing information to obtain an information processing result, and trigger the dynamic effect of the icon based on the information processing result, where in this embodiment of this application, the dynamic effect of the icon may be implemented by shaking the terminal device by a user.

In some possible implementations, the obtaining sensing information includes:

obtaining an angle between the terminal device and a horizontal direction by using a gyroscope, performing normalization processing on the angle to obtain a normalized value ranging from 0 to 1, and determining the location of the icon in the reflective icon based on the normalized value, so that conversion between the sensing information and the location of the icon in the reflective picture is implemented.

In some possible implementations, after the changing a color value of at least one pixel in a part that is of the reflective picture and that overlaps the icon, the method further includes: obtaining a mask picture, and performing image processing on the reflective picture by using the mask picture.

Optionally, the reflective picture is a semitransparent picture, and an alpha channel value of each pixel ranges from 0 to 1. Therefore, when the reflective picture is superimposed on the icon, an effect of displaying both the icon and the reflective picture is formed, and a relatively dim color may be formed at a relatively bright location in the icon. This may affect the recognition of the icon to some extent, resulting in poor user experience. Therefore, the reflective picture may be further processed according to the foregoing method, so that a dim color does not appear at the relatively bright location.

In some possible implementations, the obtaining a mask picture includes:

creating an initialization picture, superimposing the initialization picture on the icon, determining a bright location in the icon, and setting an alpha channel value of each pixel in the initialization picture based on the bright location in the icon, to obtain the mask picture.

In some possible implementations, the setting an alpha channel value of each pixel in the initialization picture based on the bright location in the icon includes: setting an alpha channel value of a location that is in the initialization picture and that corresponds to the bright location in the icon to 0, and setting an alpha channel value of a remaining location to 1.

In some possible implementations, the performing image processing on the reflective picture by using the mask picture includes:

performing image processing on the reflective picture according to the following formula by using the mask picture:

temp.*rgba*=reflective picture.*rgba*×mask.*a*, where temp.rgba is a color value of a pixel in the reflective picture after image processing is performed, reflective picture.rgba is a color value of the pixel in the reflective picture before image processing is performed, and mask.a is an alpha channel value of a location that is in the mask picture and that corresponds to the pixel in the reflective picture.

A second aspect of this application provides an image processing terminal device, including:

a memory and at least one processor, where the memory is configured to store computer-readable instructions, and the processor is configured to execute the computer-readable instructions in the memory, to perform the following operations:

obtaining a reflective picture, superimposing the reflective picture on an icon, and changing a color value of at least one pixel in a part that is of the reflective picture and that overlaps the icon.

The reflective picture is obtained, the reflective picture is superimposed on the icon, and the color value of the at least one pixel in the part that is of the reflective picture and that overlaps the icon is changed, so that the icon is enabled to display a dynamic effect. Optionally, the reflective picture is a semitransparent picture. In this case, the dynamic effect of the icon may be implemented when the icon is displayed.

In some possible implementations, the terminal device for obtaining a reflective picture includes:

creating a fully transparent picture, setting at least one target point in the fully transparent picture, setting a color value of the at least one target point, and determining a color value of a remaining pixel in the fully transparent picture based on the color value of the at least one target point.

In some possible implementations, the determining a color value of a remaining pixel in the fully transparent picture based on the color value of the at least one target point includes:

dividing the fully transparent picture into a plurality of triangles by using the at least one target point, and for any point G in the fully transparent picture, calculating a color value of the point G based on color values of three points of a triangle in which the point G is located.

In some possible implementations, the calculating a color value of the point G based on color values of three points of a triangle in which the point G is located includes:

separately connecting the point G to the three points of the triangle, to divide the triangle into three parts, and calculating the color value of the point G according to the following formula: $G=C1\times g1/g+C2\times g2/g+C3\times g3/g$, where G represents the color value of the point G, g1, g2, and g3 respectively represent areas of the three parts of the triangle, and g represents an area of the triangle.

In some possible implementations, both an edge of the reflective picture and an edge of the icon are rectangular, and a length and a width of the edge of the reflective picture are respectively greater than a length and a width of the edge of the icon.

In some possible implementations, the changing a color value of at least one pixel in a part that is of the reflective picture and that overlaps the icon includes: changing a location of the icon in the reflective icon.

In some possible implementations, the processor is further configured to obtain sensing information. The changing a location of the icon in the reflective icon includes: determining the location of the icon in the reflective icon based on the sensing information.

In some possible implementations, the obtaining sensing information includes: obtaining an angle between the terminal device and a horizontal direction by using a gyroscope, and performing normalization processing on the angle to obtain a normalized value ranging from 0 to 1. The determining the location of the icon in the reflective icon based on the sensing information includes: determining the location of the icon in the reflective icon based on the normalized value.

In some possible implementations, after the changing a color value of at least one pixel in a part that is of the reflective picture and that overlaps the icon, the following operations are further performed: obtaining a mask picture, and performing image processing on the reflective picture by using the mask picture.

In some possible implementations, the obtaining a mask picture includes:

creating an initialization picture, superimposing the initialization picture on the icon, determining a bright location in the icon, and setting an alpha channel value of each pixel in the initialization picture based on the bright location in the icon, to obtain the mask picture.

In some possible implementations, the setting an alpha channel value of each pixel in the initialization picture based on the bright location in the icon includes: setting an alpha channel value of a location that is in the initialization picture and that corresponds to the bright location in the icon to 0, and setting an alpha channel value of a remaining location to 1.

In some possible implementations, image processing is performed on the reflective picture according to the following formula by using the mask picture: temp.rgba=reflective picture.rgba×mask.a, where temp.rgba is a color value of a pixel in the reflective picture after image processing is performed, reflective picture.rgba is a color value of the pixel in the reflective picture before image processing is performed, and mask.a is an alpha channel value of a location that is in the mask picture and that corresponds to the pixel in the reflective picture.

Still another aspect of this application provides a computer-readable storage medium. The computer-readable storage medium stores instructions. When the instructions are run on a computer, the computer is enabled to perform the method according to the foregoing aspect.

It can be learned from the foregoing technical solutions that the embodiments of this application have the following advantages:

obtaining the reflective picture, superimposing the reflective picture on the icon, and changing the color value of the at least one pixel in the part that is of the reflective picture and that overlaps the icon, to enable the icon to display the dynamic effect.

BRIEF DESCRIPTION OF DRAWINGS

FIG. 3-1 is a schematic diagram of a method for obtaining a reflective picture with a gradient effect;

FIG. 3-2 is a schematic diagram of a target point in a reflective picture;

FIG. 3-3 is a schematic diagram of dividing a fully transparent picture into a plurality of triangles:

FIG. 3-4 is a schematic diagram of calculating a color value of any point in a triangle;

FIG. 3-5 is an effect diagram of a reflective picture;

FIG. 3-6 is a schematic diagram of dividing a fully transparent picture into a plurality of quadrangles:

FIG. 3-7 is a schematic diagram of calculating a color value of any point in a quadrangle;

FIG. 3-8 is a schematic diagram in which a quantity of target points is two:

FIG. 3-9 is a schematic diagram in which a quantity of target points is five;

FIG. 4-1 is a schematic diagram of an icon:

FIG. 4-2 is an effect diagram of superimposing a reflective picture on an icon;

FIG. 4-3 is another effect diagram of superimposing a reflective picture on an icon;

FIG. 4-4 is another effect diagram of superimposing a reflective picture on an icon;

FIG. 4-5 is another effect diagram of superimposing a reflective picture on an icon;

FIG. 4-6 is another effect diagram of superimposing a reflective picture on an icon;

FIG. 4-7 is another effect diagram of superimposing a reflective picture on an icon;

FIG. 5-1 is a schematic diagram of a method for triggering a dynamic effect of an icon by obtaining sensing information:

FIG. 5-2 is a schematic diagram of a normalized value and a corresponding location of an icon in a reflective picture;

FIG. 6-1 is a schematic diagram of a method for obtaining a mask picture;

FIG. 6-2 is a schematic diagram of a mask picture;

FIG. 6-3 is an effect diagram of a reflective picture on which image processing is performed by using a mask picture;

FIG. 6-4 is an effect diagram of superimposing, on an icon, a reflective picture on which image processing is performed by using a mask picture: and FIG. 7 is a schematic diagram of an embodiment of a terminal device.

DESCRIPTION OF EMBODIMENTS

Embodiments of this application provide an image processing method, to enable an icon to display a dynamic effect.

In the specification, claims, and accompanying drawings of this application, the terms "first". "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

This application is applied to a terminal device. The terminal device mentioned in the embodiments of this application may be a device that provides a user with voice and/or data connectivity, a handheld device with a wireless connection function, or another processing device connected to a wireless modem. A wireless terminal may communicate with one or more core networks through a radio access network (RAN Radio Access Network). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS, Personal Communication Service) phone, a cordless telephone set, a session initiation protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User Terminal), a terminal device, a user agent (User Agent), a user device (User Device), or user equipment (User Equipment).

Figure 1:
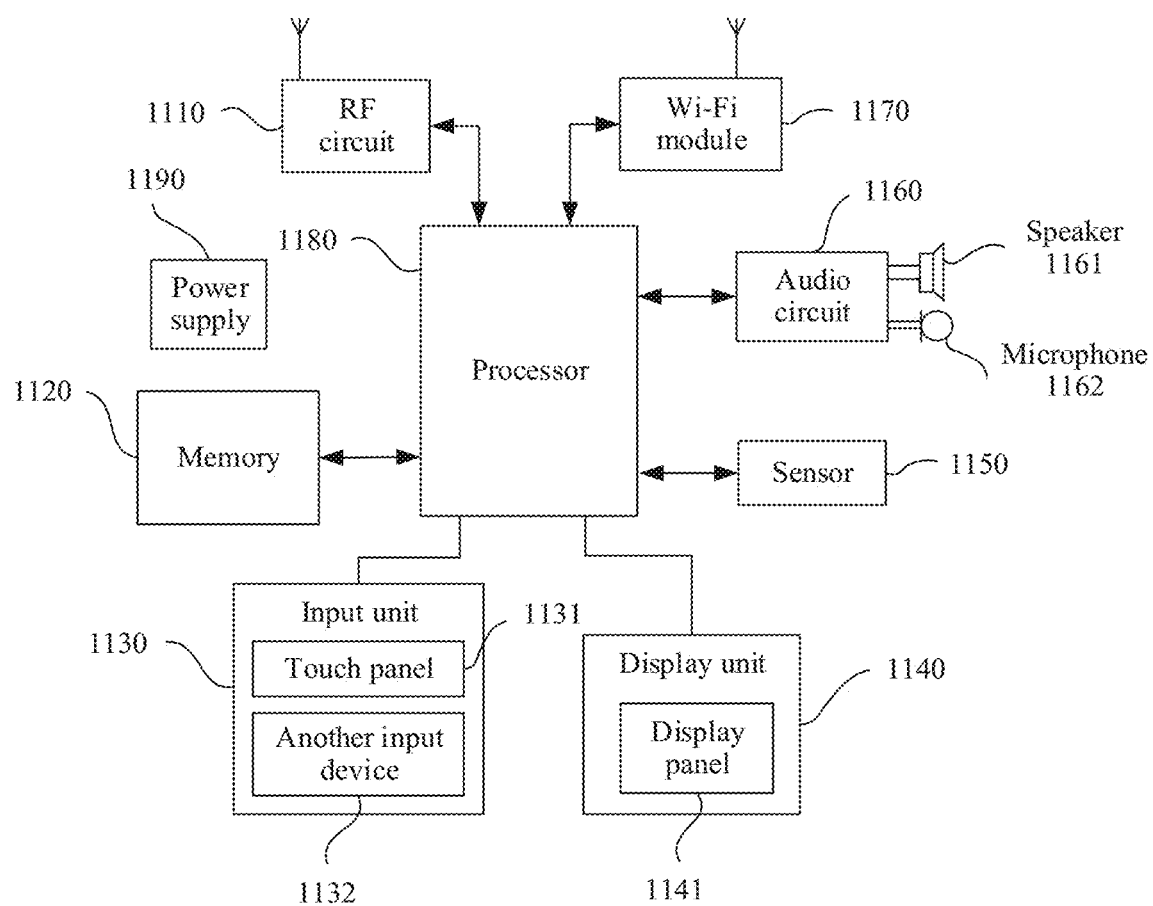
FIG. 1 is a schematic structural diagram of a mobile phone.

A mobile phone is used as an example. Referring to FIG. 1 (which is a schematic structural diagram of the mobile phone), the mobile phone includes a radio frequency (Radio Frequency, RF) circuit 1110, a memory 1120, an input unit 1130, a display unit 1140, a sensor 1150, an audio circuit 1160, a wireless fidelity (wireless fidelity, Wi-Fi) module 1170, a processor 1180, and a power supply 1190. A person skilled in the art may understand that a structure of the mobile phone shown in FIG. 1 does not constitute a limitation on the mobile phone. The mobile phone may include more or fewer components than those shown in the figure, or may include a combination of some components, or may have different component arrangements.

The following describes each component of the mobile phone in detail with reference to FIG. 1.

The RF circuit 1110 may be configured to send and receive signals in an information sending and receiving process or a call process. Particularly, the RF circuit 1110 receives downlink information from a base station, and then delivers the downlink information to the processor 1180 for processing. In addition, the RF circuit 1110 sends related uplink data to the base station. Usually, the RF circuit 1110 includes but is not limited to an antenna, at least one amplifier, a transceiver, a coupler, a low noise amplifier (Low Noise Amplifier, LNA), a duplexer, and the like. In addition, the RF circuit 1110 may further communicate with a network and another device through wireless communication. Any communications standard or protocol may be used for the wireless communication, including but not limited to a global system for mobile communications (Global System of Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 1120 may be configured to store a software program and a module. The processor 1180 executes various function applications of the mobile phone and processes data by running the software program and the module that are stored in the memory 1120. The memory 1120 may mainly include a program storage area and a data storage area. The program storage area may store an operating system, an application required by at least one function (such as a voice playing function and an image playing function), and the like. The data storage area may store data (such as audio data and a phone book) that is created based on use of the mobile phone, and the like. In addition, the memory 1120 may include a high-speed random access memory, and may further include a nonvolatile memory such as at least one magnetic disk storage device and a flash memory device, or another volatile solid-state storage device.

The input unit 1130 may be configured to: receive entered digit or character information, and generate a key signal input related to a user setting and function control of the mobile phone. Specifically, the input unit 1130 may include a touch panel 1131 and another input device 1132. The touch panel 1131, also referred to as a touchscreen, may collect a touch operation (for example, an operation performed by a user on or near the touch panel 1131 by using any suitable object or accessory such as a finger or a stylus) performed by the user on or near the touch panel 1131, and may drive a corresponding connection apparatus based on a preset program. Optionally, the touch panel 1131 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, sends the touch point coordinates to the processor 1180, and receives and executes a command sent by the processor 1180. In addition, the touch panel 1131 may be implemented in a plurality of types, such as a resistive type, a capacitive type, an infrared type, and a surface acoustic wave type. The input unit 1130 may further include the another input device 1132 in addition to the touch panel 1131. Specifically, the another input device 1132 may include but is not limited to one or more of a physical keyboard, a function key (such as a volume control key or a power on/off key), a trackball, a mouse, a joystick, and the like.

The display unit 1140 may be configured to display information entered by the user or information provided for the user, and various menus of the mobile phone. The display unit 1140 may include a display panel 1141. Optionally, the display panel 1141 may be configured in a form of a liquid crystal display (Liquid Crystal Display, LCD), an organic light-emitting diode (Organic Light-Emitting Diode, OLED), or the like. Further, the touch panel 1131 may cover the display panel 1141. After the touch panel 1131 detects a touch operation on or near the touch panel 1131, the touch operation is transmitted to the processor 1180 to determine a type of a touch event. Then, the processor 1180 provides a corresponding visual output on the display panel 1141 based on the type of the touch event. Although the touch panel 1131 and the display panel 1141 are used as two independent parts in FIG. 1 to implement input and input functions of the mobile phone, in some embodiments, the touch panel 1131 and the display panel 1141 may be integrated to implement the input and output functions of the mobile phone.

The mobile phone may further include at least one sensor 1150, such as an optic sensor, a movement sensor, and another sensor. Specifically, the optic sensor may include an ambient light sensor and a proximity sensor. The ambient light sensor may adjust luminance of the display panel 1141 based on brightness of ambient light. The proximity sensor may turn off the display panel 1141 and/or backlight when the mobile phone approaches an ear. As a type of motion sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may further be configured in the mobile phone. Details are not described herein again.

The audio circuit 1160, a speaker 1161, and a microphone 1162 may provide an audio interface between the user and the mobile phone. The audio circuit 1160 may convert received audio data into an electrical signal, and then transmit the electrical signal to the speaker 1161, and the speaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the processor 1180 sends the audio data to, for example, another mobile phone through the RF circuit 1110, or outputs the audio data to the memory 1120 for further processing.

Wi-Fi is a short-distance wireless transmission technology. With the Wi-Fi module 1170, the mobile phone may help the user send and receive an email, browse a web page, access streaming media, and the like. The Wi-Fi module 1170 provides wireless access to the broadband internet for the user. Although FIG. 1 shows the Wi-Fi module 1170, it can be understood that the Wi-Fi module 1170 is not a necessary constituent of the mobile phone and may be omitted as required provided that the essence of the present invention is not changed.

The processor 1180 is a control center of the mobile phone, connects various components of the entire mobile phone through various interfaces and lines, and executes various functions and processes data of the mobile phone by running or executing the software program and/or the module stored in the memory 1120 and invoking data stored in the memory 1120, to perform overall monitoring on the mobile phone. Optionally, the processor 1180 may include one or more processing units. Preferably, an application processor and a modem processor may be integrated into the processor 1180. The application processor mainly processes an operating system, a user interface, an application, and the like. The modem processor mainly processes wireless communication. It may be understood that the modem processor may alternatively not be integrated into the processor 1180.

The mobile phone further includes the power supply 1190 (such as a battery) supplying power to the components. Preferably, the power supply may be logically connected to the processor 1180 by using a power management system, to implement functions such as management of charging, discharging, and power consumption by using the power management system. Although not shown, the mobile phone may further include a camera, a Bluetooth module, and the like. Details are not described herein again.

An icon is used to indicate software or an application to a user. In a process in which the user performs human-machine interaction with a terminal such as a mobile phone or a computer, the user clicks the icon by using a mouse or a finger to open the software or the application. The icon is a user's first impression of the software or the application, and has great impact on promotion of the software or the application. Currently, the icon is mainly static, that is, the icon is displayed as a still picture on the terminal. More vendors propose dynamic icon solutions. However, dynamic icons in the solutions are generally used in applications such as a calendar and a clock, where icon statuses such as time and a date are refreshed at a specific interval according to the solutions. For example, on an iPhone, a home screen clock icon changes with time. For another example, on a Huawei phone, a calendar icon changes with a date. The dynamic icon is mainly applied to the software or the application such as the calendar or the clock. There is no dynamic icon solution for common software or a common application.

This application provides an image processing method. A reflective picture is first obtained, and then the reflective picture is superimposed on an icon. A color value of at least one pixel in a part that is of the reflective picture and that overlaps the icon is changed, to enable the icon to display a dynamic effect.

Figure 2:
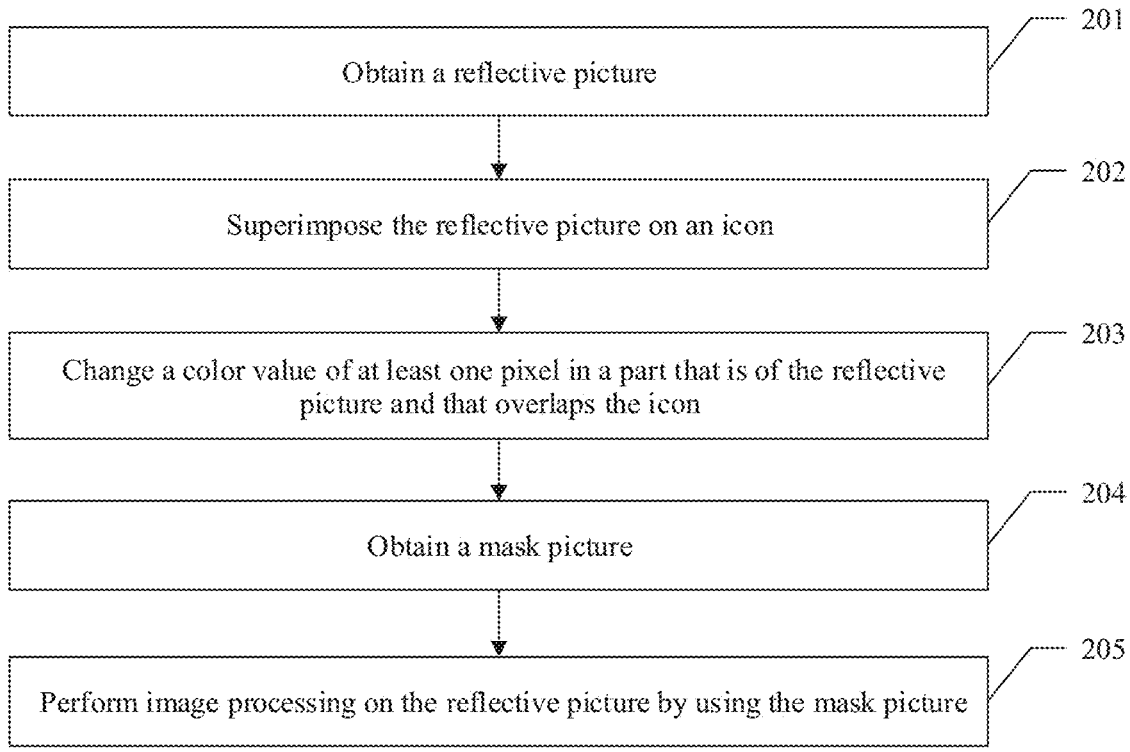
FIG. 2 is a schematic diagram of an embodiment of an image transmission method.

In view of this, referring to FIG. 2, this application provides an image transmission method, including the following steps.

201. Obtain a reflective picture.

In some possible implementations, the reflective picture may be a ready-made reflective picture, or the reflective picture may be obtained through program calculation.

It should be noted that "semitransparent" means that an alpha channel value of any pixel in the reflective picture is less than 1. An alpha channel value is generally used as a parameter of opacity and can be expressed as a percentage, an integer, or a decimal ranging from 0 to 1. The percentage is used as an example. If an alpha channel value of a pixel is 0%, the pixel is completely transparent, that is, completely invisible. If the pixel is superimposed on another pixel, the superimposed pixel is completely displayed. If an alpha channel value of a pixel is 100%, it means that the pixel is completely opaque. In other words, if the pixel is superimposed on another pixel, the superimposed pixel is completely blocked. A pixel whose alpha channel value between 0% and 100% is a semitransparent pixel. If the semitransparent pixel is superimposed on another pixel, both the semitransparent pixel and the superimposed pixel may be displayed. This is like seeing, through tinted transparent glass (the semitransparent pixel), an object behind the glass (the another pixel).

Hereinafter, the reflective picture obtained through the program calculation is used as an example for description.

It should be noted that, if the reflective picture is a picture with distinct colors at different locations, when the reflective picture is superimposed on an icon, recognition of the icon is affected. However, if a color of the reflective picture is monotonous, a dynamic effect is not obvious. Therefore, a reflective picture with a better effect should be a picture that does not affect recognition of an icon and has relatively rich colors, for example, a picture with a gradient effect. Therefore, in this embodiment of this application, a reflective picture with a gradient effect may be created.

Figures 1, 3:
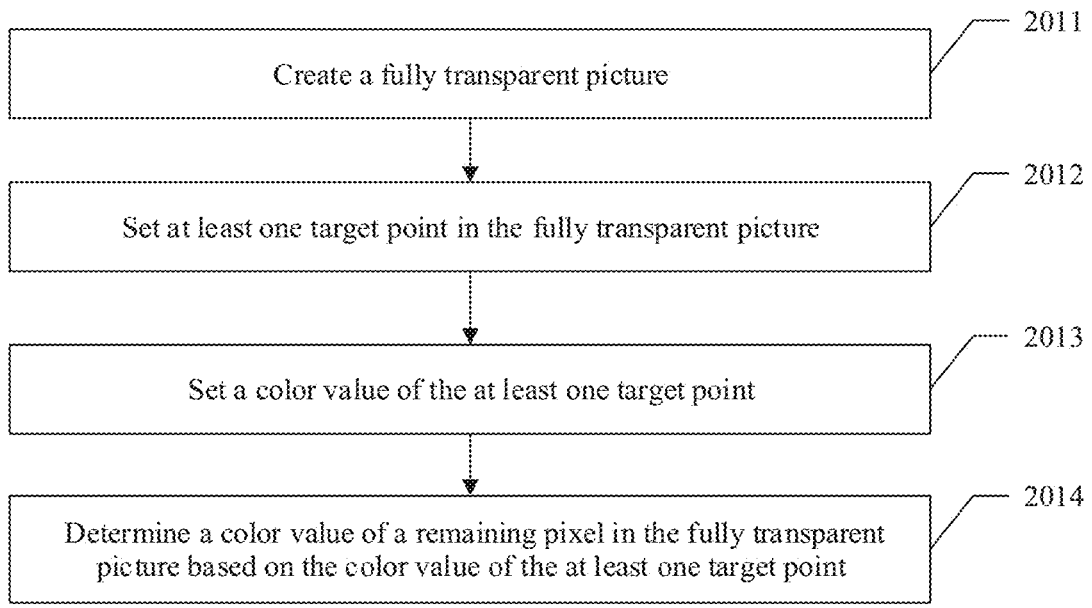
Figures 2, 3:
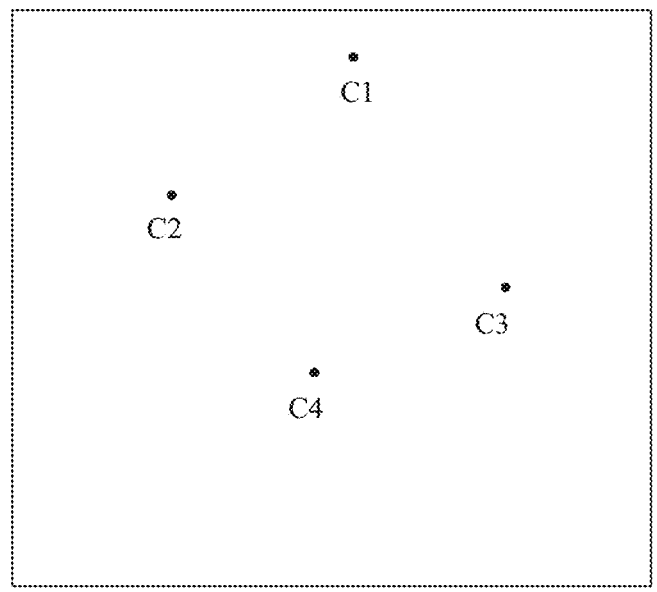
Figure 3:
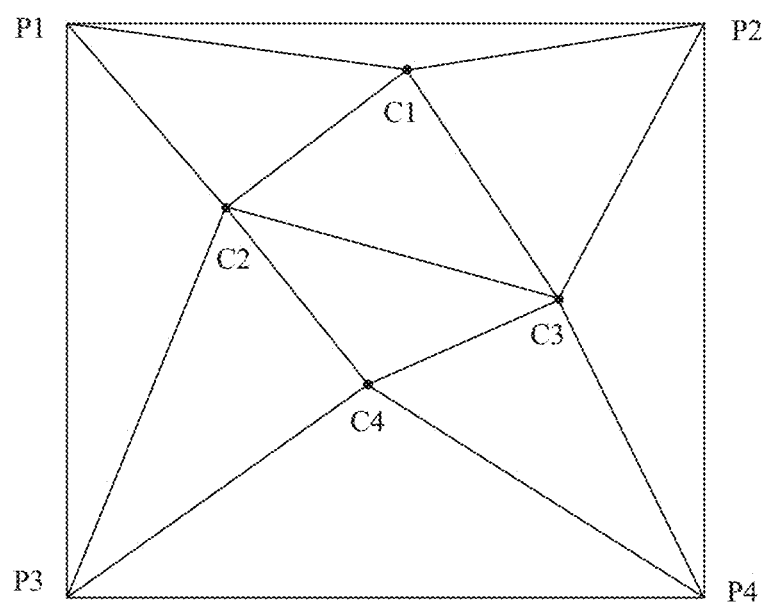

FIG. 3-1 shows a method for obtaining the reflective picture with the gradient effect. The method includes the following steps.

2011: Create a fully transparent picture.

In some possible implementations, the fully transparent picture may be as large as the icon, or may be larger than the icon. This is not limited herein. The fully transparent picture is a picture in which RGBA values of all pixels are (0, 0, 0, 0). The RGBA value means that an additional alpha channel value is added to an RGB color model and used as a fourth dimension to describe color space. A color value in this embodiment of this application is an RGBA value. It should be noted that the alpha channel value may range from 0 to 1, or may range from 0 to 100%. In this embodiment of this application, 0 to 1 is used as an example for description.

In some possible implementations, the color value may be represented by using an RGB value or the RGBA value. The RGB value is a color standard based on the RGB color model. Various colors are obtained by changing red, green, and blue color channels and superimposing the color channels. The three letters "RGB" are respectively initial letters of red, green, and blue. The RGB value may be represented by a three-dimensional vector (R, G, B). In some possible implementations, a value range of an R value/G value/B value may be 0 to 255. For example, (255, 0, 0) represents pure red, (0, 255, 0) represents pure green, (128, 0, 128) represents purple, (0, 0, 0) represents pure black, and (255, 255, 255) represents pure white. The RGB color model can describe almost all colors that human vision can perceive, and is one of most widely used color systems at present.

Therefore, a pixel whose RGBA value is (0, 0, 0, 0) is a black pixel because an R value, a G value, and a B value are all 0. However, because an alpha channel value of the pixel is 0, the pixel is completely transparent. The pixel is invisible regardless of being superimposed on any background, but the superimposed background is displayed. In this embodiment of this application, the fully transparent picture is created, and an RGBA value of the fully transparent picture is (0, 0, 0, 0). In other words, the picture is fully transparent. In this case, the fully transparent picture is invisible regardless of being superimposed on any background.

2012: Set at least one target point in the fully transparent picture.

It should be noted that a quantity and locations of the target points may be randomly set, or may be fixedly set in advance. This is not limited herein. In this embodiment of this application, as shown in FIG. 3-2 (which is a schematic diagram of target points in the reflective picture), there are four target points, respectively disposed at C1, C2, C3, and C4.

2013: Set a color value of the at least one target point.

In some possible implementations, the color value of the at least one target point may be preset or randomly set. In this embodiment of this application, a color value, namely, an RGBA value, of at least one of the target points C1, C2, C3, and C4 shown in FIG. 3-2 may be set. In this case, C1=(100, 125, 241, 0.1), C2=(84, 76, 1, 0.76), C3=(77, 35, 255, 0.34), and C4=(0, 45, 12, 0.53) may be set, where C1, C2, C3, and C4 respectively represent color values of the point C1, the point C2, the point C3, and the point C4.

2014: Determine a color value of a remaining pixel in the fully transparent picture based on the color value of the at least one target point.

It should be noted that, to obtain the reflective picture with the gradient effect through calculation, a color value of any non-target point in the picture should be closer to a color value of a target point when the any non-target point is closer to the target point, and color values of any two points are closer when the any two points are closer.

In view of this, this application provides a method for determining the color value of the remaining pixel in the fully transparent picture by using the at least one target point, to divide, by using four corners of the fully transparent picture and the at least one target point, the picture into a plurality of triangles that do not overlap each other, and then calculate a color value of any point in the fully transparent picture based on color values of three corners of a triangle in which the point is located.

Specifically, as shown in FIG. 3-3 (which is a schematic diagram of dividing the fully transparent picture into the plurality of triangles), it is assumed that the four corners of the fully transparent picture are respectively P1/P2/P3, and P4, and P1/P2/P3, and P4 and the four target points are connected in a manner shown in FIG. 3-3, to divide the fully transparent picture into 10 triangles that do not overlap each other. To ensure that different triangles do not overlap, C2 and C3 are connected, and C1 and C4 are not connected. In some possible implementations, alternatively, C1 and C4 may be connected, and C2 and C3 may not be connected. This is not limited herein.

Then, a color value of any point in the fully transparent picture may be calculated based on color values of three points of a triangle in which the point is located.

Figures 3, 4:
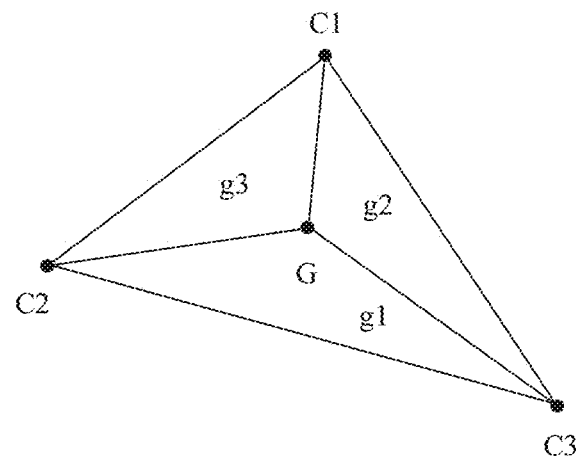

A point G is used as an example. As shown in FIG. 3-4 (which is a schematic diagram of calculating a color value of any point in a triangle), the point G is located in a triangle C1-C2-C3.

First, the point G is separately connected to the point C1, the point C2, and the point C3, to divide the triangle C1-C2-C3 into three parts: respectively g1, g2, and g3. It is clear that when the point G is closer to the point C2, an area of the relative g2 is larger; when the point G is closer to the point C1, an area of the relative g1 is larger; and when the point G is closer to the point C3, an area of the relative g3 is larger. Based on a principle that the closer the point G is to a point, the closer a color value of the point G is to a color value of the point, it can be learned that closeness of the point G to a point is positively correlated with an area of a part relative to the point. In this embodiment of this application, the color value of the point G may be determined based on C1, C2, and C3 and corresponding areas of g1, g2, and g3.

In this embodiment of this application, the color value of the point G is calculated according to the following formula:

$$G = C1 \times g1/g + C2 \times g2/g + C3 \times g3/g$$

G represents the color value of the point G; g1, g2, and g3 respectively represent the areas of the parts; g represents an area of the triangle C1-C2-C3; g1/g represents an area proportion of g1 to g; g2/g represents an area proportion of g2 to g; g3/g represents an area proportion of g3 to g; and C1, C2, and C3 respectively represent color values of the point C1, the point C2, and the point C3. In this embodiment of this application, when the point G is close to a point, a proportion of an area of a relative part of the point to the area of the triangle C1-C2-C3 is used as a proportion of impact of a color value of the point on the point G. In this case, when the point G is closer to the point, impact of the point on the color value of the point G is greater, and the color value of the point G is closer to the color value of the point.

For example, if g1/g=0.3, g2/g=0.2, and g3/g=0.5, and because g3 is a relative part of C3 and g3 occupies a relatively high proportion, it indicates that the point G is closer to C3 than C1 and C2. In this case, the color value of C3 has greater impact on the color value of the point G.

Based on the data in step 2013, the color value of the point G may be calculated as follows:

$$G = C1 \times 0.3 + C2 \times 0.2 + C3 \times 0.5$$
$$= (100, 125, 241, 0.1) \times 0.3 + (84, 76, 1, 0.76) \times$$
$$0.2 + (77, 35, 255, 0.34) \times 0.5$$
$$= (85.3, 70.2, 200, 0.352)$$

Figures 3, 4, 5:
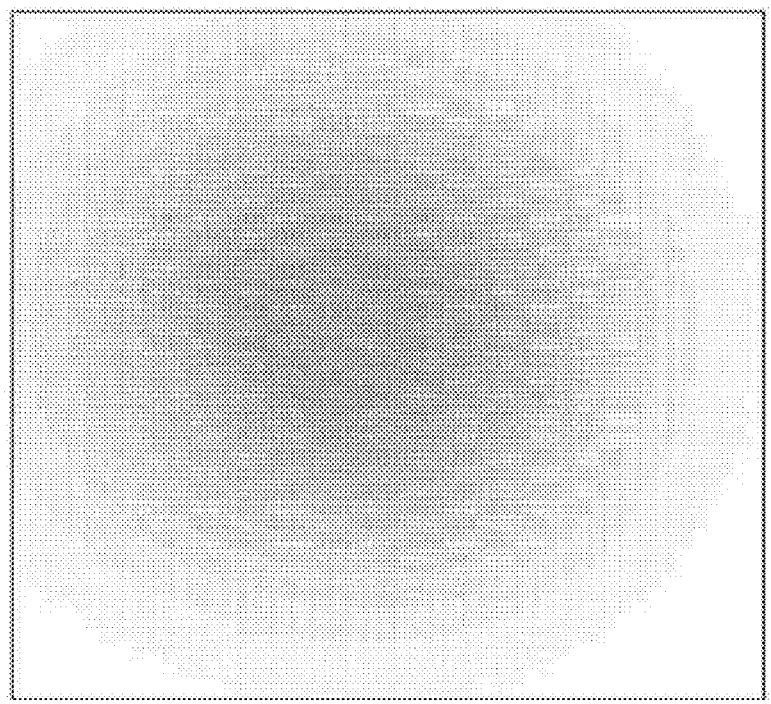

By analogy, a color value of any pixel in the picture may be obtained through calculation, and finally an effect diagram of the reflective picture shown in FIG. 3-5 is obtained.

It should be noted that the reflective picture formed according to the foregoing steps is a color picture, and cannot be displayed in the application document. Therefore, the picture shown in FIG. 3-5 is a picture obtained after grayscale processing is performed on the reflective picture.

In some possible implementations, the fully transparent picture may alternatively be divided into a plurality of quadrilaterals, pentagons, or other polygons. The quadrilateral is used as an example. FIG. 3-6 (which is a schematic diagram of dividing the fully transparent picture into the plurality of quadrangles) shows a division solution.

As shown in FIG. 3-7 (which is a schematic diagram of calculating a color value of any point in a quadrangle), if the point G is in a quadrilateral C1-C2-C3-C4, the quadrilateral C1-C2-C3-C4 may be divided into four triangles: g1, g2, g3, and g4. In this case, a formula for the color value of G may be:

$$G=\frac{1}{2}\times[C1\times(g1+g2)/g+C2\times(g2+g4)/g+C3\times(g1+g3)/g+C4\times(g3+g4)/g]$$

G represents the color value of the point G; g1, g2, g3, and g4 respectively represent areas of the parts; g represents an area of the quadrangle C1-C2-C3-C4; (g1+g2)/g represents an area proportion of g1 and g2 to g; and C1, C2, and C3 respectively represent color values of a point C1, a point C2, and a point C3. In this embodiment of this application, when the point G is close to a point, a proportion of an area of a relative part of the point to the area of the quadrangle C1-C2-C3-C4 is used as a proportion of impact of a color value of the point on the point G. In this case, when the point G is closer to the point, impact of the point on the color value of the point G is greater, and the color value of the point G is closer to the color value of the point. For example, a relative part of C1 is g1+g2, a relative part of C2 is g2+g4, a relative part of C3 is g1+g3, and a relative part of C4 is g3+g4. In addition, because a sum of (g1+g2)/g, (g2+g4)/g, (g1+g3)/g, and (g3+g4)/g is 2, it is necessary to multiply by ½ herein, so that a value of each dimension in an RGBA value of the point G falls within a specific range.

In some possible implementations, the quantity of the target points may be one, two, three, five, or another quantity. This is not limited herein. For example, the quantity of the target points is two. As shown in FIG. 3-8 (which is a schematic diagram in which the quantity of the target points is two), there are only two target points: C1 and C2. The fully transparent picture is divided into six triangles by using C1 and C2 and the four corners of the fully transparent picture. A method for calculating a color value of any point is shown in step 2014, and details are not described herein.

For example, the quantity of the target points is five. As shown in FIG. 3-9 (which is a schematic diagram in which the quantity of the target points is five), there are five target points: C1, C2, C3, C4, and C5. The fully transparent picture is divided into 12 triangles by using C1, C2, C3, C4, and C5 and the four corners of the fully transparent picture. A method for calculating a color value of any point is shown in step 2014, and details are not described herein.

It should be noted that the reflective picture with the gradient effect may be generated not only by using the foregoing method, but also in another manner. For example, a color value (255, 255, 255, 0.9) of any pixel on the left of the reflective picture is evenly gradient to a color value (0, 0, 0, 0.1) of any pixel on the right of the reflective picture. This is not limited herein. It should be noted that the reflective picture is not limited to having the gradient effect, and may alternatively be another type of picture, such as a landscape painting or a movie poster. This is not limited herein.

202: Superimpose the reflective picture on the icon.

After the reflective picture is obtained, the reflective picture may be superimposed on the icon. It should be noted that both an edge of the reflective picture and an edge of the icon may be rectangular, and a length and a width of the edge of the reflective picture are respectively greater than/equal to a length and a width of the edge of the icon. It should be noted that the icon in this embodiment of this application is an identifier of software or an application displayed on a screen of a terminal device, and is used to identify the application or the software for a user, so that the user can use the application or the software. In some possible implementations, the icon may alternatively be an icon that functions as an identifier, for example, an identifier of a warning. This is not limited herein.

In this embodiment of this application, an icon shown in FIG. 4-1 (which is a schematic diagram of the icon) is used as an example for description. It should be noted that, in actual application, the icon shown in FIG. 4-1 may be colored or black-white-gray. Due to a color limitation on the accompanying drawings in the application document, an example in which the icon shown in the figure is black-white-gray is used. An alpha channel value of the icon may be 1, 0, or between 0 and 1. This is not limited herein.

In this embodiment of this application, the reflective picture shown in FIG. 3-5 is superimposed on the icon shown in FIG. 4-1 to obtain an effect shown in FIG. 4-2 (which is the effect diagram of superimposing the reflective picture on the icon). In this embodiment of this application, an example in which the reflective picture is larger than the icon is used for description.

If a location of the icon in the reflective picture is shown in FIG. 4-2, because an alpha channel value of the location in the reflective picture and at which the icon is located is relatively large, the terminal device displays an effect diagram of the ion shown in FIG. 4-3 (which is another effect diagram of superimposing the reflective picture on the icon). This icon is greatly affected by the reflective picture and appears relatively blurry. If a location of the icon in the reflective picture is shown in FIG. 4-4 (which is another effect diagram of superimposing the reflective picture on the icon), because an alpha channel value of the location at which the icon is located is relatively small, the terminal device displays an effect diagram of the icon shown in FIG. 4-5 (which is another effect diagram of superimposing the reflective picture on the icon). This icon is less affected by the reflective picture and appears relatively clear. In some possible implementations, the reflective picture is as large as the icon. In this case, when the reflective picture is superimposed on the icon, an effect diagram of the icon shown in FIG. 4-6 (which is another effect diagram of superimposing the reflective picture on the icon) is displayed.

203: Change a color value of at least one pixel in a part that is of the reflective picture and that overlaps the icon.

In this embodiment of this application, to implement a dynamic effect of the icon, the terminal device needs to display a changing reflective picture on the icon, In this case, the color value of the at least one pixel in the part that is of the reflective picture and that overlaps the icon needs to be changed.

In some possible implementations, the location of the icon in the reflective picture may be changed, to change the color value of the at least one pixel in the part that is of the reflective picture and that overlaps the icon. For example, when the location of the icon in the reflective picture is shown in FIG. 4-2, the icon displays the effect diagram shown in FIG. 4-3 on the terminal device. When the location of the icon in the reflective picture is shown in FIG. 4-4, the icon displays the effect diagram shown in FIG. 4-5 on the terminal device. In this way, the color value of the at least one pixel in the part that is of the reflective picture and that overlaps the icon is changed.

In some possible implementations, the color value of the at least one pixel in the part that is of the reflective picture and that overlaps the icon may alternatively be randomly changed. For example, for the effect diagram of the icon shown in FIG. 4-6, a color value of a location in the reflective picture and at which the icon is located may be changed, to obtain an effect diagram of the icon shown in FIG. 4-7 (which is another effect diagram of superimposing the reflective picture on the icon).

However, when the reflective picture is a gradient picture, if a color value of a part in the reflective picture is randomly changed, as shown in FIG. 4-7, the reflective picture is caused to lose a gradient feature. Therefore, in some feasible embodiments, if the reflective picture is a reflective picture that is generated according to steps 2011 to 2014 and that has the gradient feature, the color value of the at least one target point may be changed, or a location of the at least one target point may be changed. In this case, a color value of any pixel in the reflective picture needs to be calculated based on a changed color value of the at least one target point, to re-determine the color value. This affects a color value of each pixel in the entire reflective picture. When the color value and/or the location of the at least one target point changes, a method for calculating a color value of a remaining pixel is the same as step 2014, and details are not described herein.

In some possible implementations, the dynamic effect of the icon may be non-triggered or triggered. Non-triggering means that the dynamic effect of the icon can be automatically changed without performing any operation on the terminal device. However, when the screen is locked or the terminal device is not used, the dynamic effect of the icon is not required. Therefore, optionally, in some possible implementations, the dynamic effect of the icon may be triggered by using some trigger conditions.

Specifically, in some possible implementations, the terminal device may obtain sensing information, perform information processing on the sensing information to obtain an information processing result, and trigger the dynamic effect of the icon based on the information processing result. In this embodiment of this application, the dynamic effect of the icon may be implemented by shaking the terminal device by the user.

Referring to FIG. 5-1, this application provides a method for triggering the dynamic effect of the icon by obtaining the sensing information, and the method includes the following steps.

2031: Obtain the sensing information.

In this embodiment of this application, the terminal may obtain the sensing information by using an angle sensing sensor such as a gyroscope. Specifically, the gyroscope may detect an angle between the terminal device and a horizontal direction, and the angle is used as the sensing information.

It should be noted that, in this embodiment of this application, an angle of the terminal device is represented by (a, b), where a is used to represent the angle between the terminal device and the horizontal direction, and b is used to represent an angle between the terminal device and a vertical direction. When the terminal device is placed flat on a horizontal plane, for example, on a desktop of a desk, and the screen faces upward, a value of the angle of the terminal device is (0°, 0°). If the terminal device faces downward, the value of the angle of the terminal device is (180°, 180°).

2032: Change the location of the icon in the reflective picture based on the sensing information.

In this embodiment of this application, after the sensing information is obtained, information processing may be performed on the sensing information. In this embodiment of this application, normalization processing may be performed on the value (a, b) of the angle of the terminal device to obtain a normalized value (x, y), where x=a/180°, and y=b/180°. For example, an angle (90°, 90°) is equal to a normalized value (0.5, 0.5).

After the normalized value is determined, the terminal device may determine, based on the normalized value, to trigger the dynamic effect of the icon. In this embodiment of this application, an example in which the location of the icon in the reflective picture is changed is used for description. Specifically, x represents a horizontal coordinate of the location of the icon in the reflective picture, y represents a vertical coordinate of the location of the icon in the reflective picture, and both value ranges of x and y are [0, 1]. When x is equal to 0, it indicates that the icon is on the leftmost side of the reflective picture in the horizontal direction. When x is equal to 1, it indicates that the icon is on the rightmost side of the reflective picture in the horizontal direction. When y is equal to 0, it indicates that the icon is on the bottommost side of the reflective picture in the vertical direction. When y is equal to 1, it indicates that the icon is on the topmost side of the reflective picture in the vertical direction.

For example, as shown in FIG. 5-2 (which is a schematic diagram of a normalized value and a corresponding location of the icon in the reflective picture), when the normalized value is equal to (0, 0), the icon is located in the lower-leftmost corner of the reflective picture. When the normalized value is equal to (1, 1), the icon is located in the upper-rightmost corner of the reflective picture. When the normalized value is equal to (1, 0), the icon is located in the lower-rightmost corner of the reflective picture. When the normalized value is equal to (0, 1), the icon is in located in the upper-leftmost corner of the reflective picture. In another case, the icon is located at a remaining location in the reflective picture.

According to the foregoing method, the angle between the terminal device and the horizontal direction is changed by shaking the terminal device by the user, to change different locations of the icon in the reflective picture, so that a location at which the icon and the reflective picture overlap is different. Because color values of different locations in the reflective picture are different, the dynamic effect of the icon is implemented.

In some possible implementations, the normalized value may also affect a color or the location of the at least one target point in the reflective picture, to implement the dynamic effect of the icon. This is not limited herein. In some possible implementations, the dynamic effect of the icon may alternatively be triggered by using another sensing information, for example, a temperature sensor. This is not limited herein.

204: Obtain a mask picture.

Optionally, the reflective picture is a semitransparent picture, and an alpha channel value of each pixel ranges from 0 to 1. Therefore, when the reflective picture shown in FIG. 3-5 is superimposed on the icon shown in FIG. 4-1, an effect of displaying both the icon and the reflective picture is formed, and the effect diagram, shown in FIG. 4-3, FIG. 4-5, or FIG. 4-6, of superimposing the reflective picture on the icon is obtained. A relatively dim color is formed at a relatively bright location in the icon. This may affect the recognition of the icon to some extent, resulting in poor user experience. Therefore, in some possible implementations, the reflective picture may be further processed, so that a dim color does not appear at the relatively bright location.

Figures 3, 4, 5, 6:
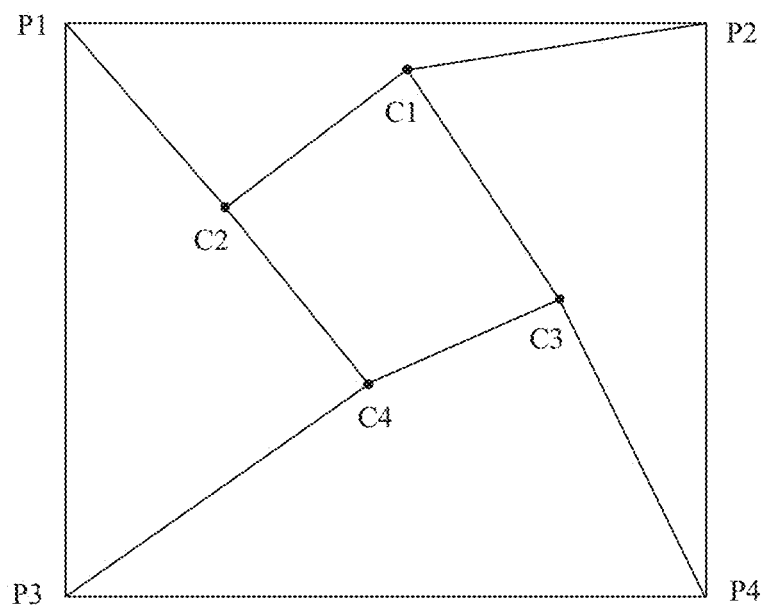

Therefore, referring to FIG. 6-1, this application provides method for obtaining the mask picture. The method includes the following steps.

2041: Create an initialization picture.

In this embodiment of this application, the initialization picture may be created, and named as the mask picture, which means that a location that is in the reflective picture and that corresponds to a relatively bright part of the icon is masked. In this embodiment of this application, an initial color value of the mask picture may be (0, 0, 0, 0) or (0, 0, 0, 1). If the color value of the mask picture is equal to (0, 0, 0, 0), an alpha channel value of the mask picture is 0, and the black picture is a completely transparent black picture. If the color value of the mask picture is equal to (0, 0, 0, 1), an alpha channel value of the mask picture is 1, and the black picture is a completely opaque black picture.

2042: Superimpose the initialization picture on the icon.

Optionally, a size of the initialization picture is the same as that of the icon. When the initialization picture is superimposed on the icon, the initialization picture and the icon exactly overlap.

2043: Determine a bright location in the icon.

In this embodiment of this application, luminance of each pixel in the icon may be calculated, to determine the bright location in the icon.

Specifically, a general luminance calculation formula may be used for calculation:

$$Y=((R\times 0.299)+(G\times 0.587)+(B\times 0.114))$$

Y represents luminance of a pixel, R represents an R value in an RGBA value of the pixel, G represents a G value in the RGBA value of the pixel, and B represents a B value in the RGBA value of the pixel. If a Y value of a pixel is greater than a threshold (for example, 90), it is determined that the pixel is located at the bright location. Otherwise, it is determined that the pixel is located at a non-bright location. The icon in FIG. 4-1 is used as an example. After the bright location in the icon is determined according to the foregoing method. FIG. 6-2 (which is a schematic diagram of the mask picture) may be obtained, where a white part is the bright location, and a black part is the non-bright location.

2044: Set an alpha channel value of each pixel in the initialization picture based on the bright location in the icon, to obtain the mask picture.

After the bright location and the non-bright location are determined, at the bright location in the icon, an alpha channel value of a pixel corresponding to the mask picture may be set to 0, and a color value of the pixel is (0, 0, 0, 0). At the non-bright location in the icon, an alpha channel value of a pixel corresponding to the mask picture may be set to 1, and a color value of the pixel is (0, 0, 0, 1).

The mask picture is obtained according to steps 2041 to 2044.

205: Perform image processing on the reflective picture by using the mask picture.

After the mask picture is obtained, image processing may be performed on the reflective picture according to the following formula:

$$temp.rgba=reflective\ picture.rgba\times mask.a$$

temp.rgba is a color value of a pixel in the reflective picture after image processing is performed, reflective picture.rgba is a color value of the pixel before image processing is performed, and mask.a is an alpha channel value of a location that is in the mask picture and that corresponds to the pixel in the reflective picture. After the foregoing image processing, for the bright location in the icon, an alpha channel value of a pixel in the reflective picture is equal to 0, that is, the pixel is invisible. For the non-bright location in the icon, an alpha channel value of a pixel in the reflective picture is equal to an original value, and the pixel is visible.

For example, the size of the icon and the size of the reflective picture are the same. For the reflective picture shown in FIG. 3-5, after the foregoing image processing, an effect diagram shown in FIG. 6-3 (which is an effect diagram of the reflective picture on which image processing is performed by using the mask picture) is obtained.

When the reflective picture shown in FIG. 6-3 is superimposed on the icon shown in FIG. 4-1, an effect diagram, shown in FIG. 6-4 (which is an effect diagram of superimposing, on the icon, the reflective picture on which image processing is performed by using the mask picture), of the icon may be obtained. In other words, at the bright location in the icon, the corresponding pixel in the reflective picture is invisible, and at the non-bright location in the icon, the corresponding pixel in the reflective picture is visible.

Figures 3, 4, 5, 6, 7:
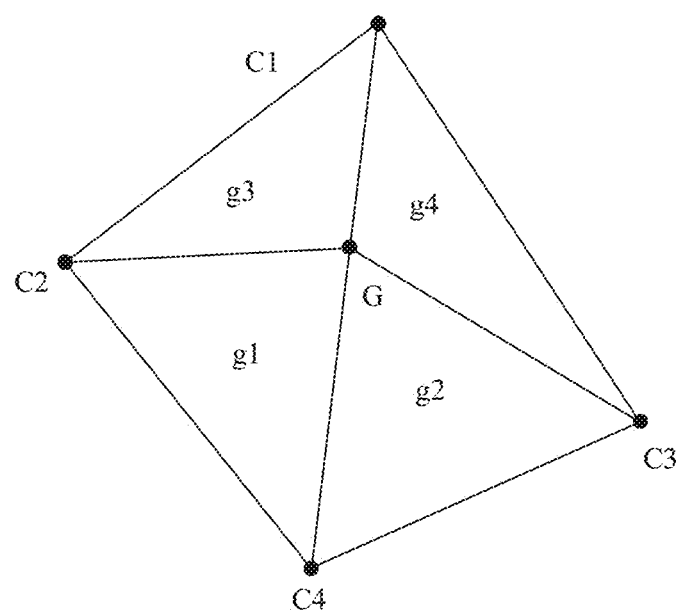
Figures 3, 4, 5, 6, 7, 8:
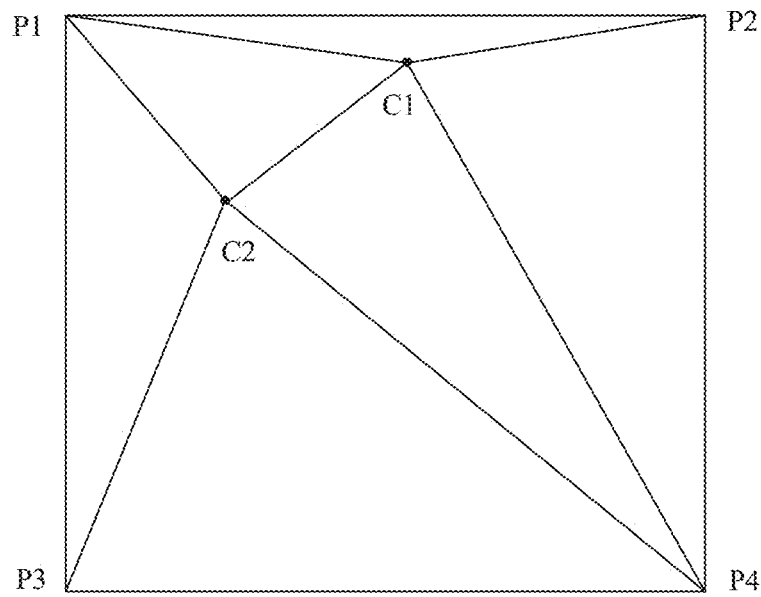
Figures 3, 4, 5, 6, 7, 8, 9:
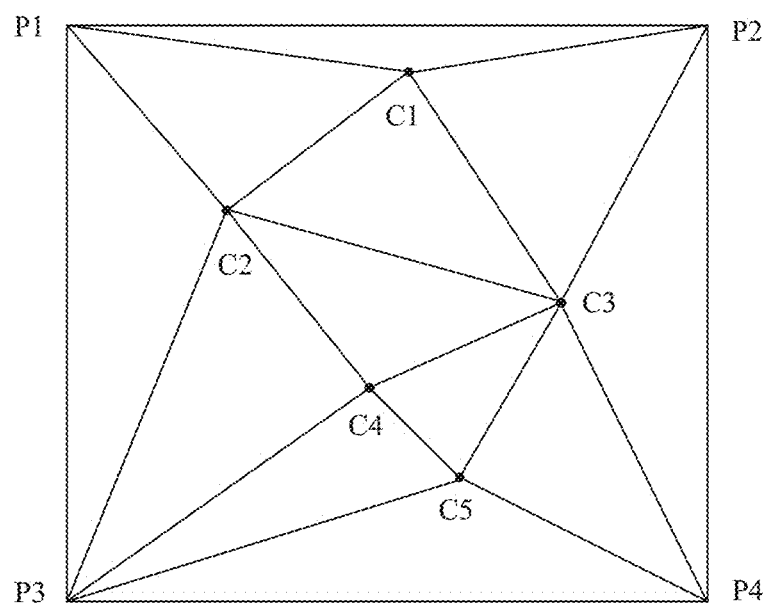
Figures 1, 4:
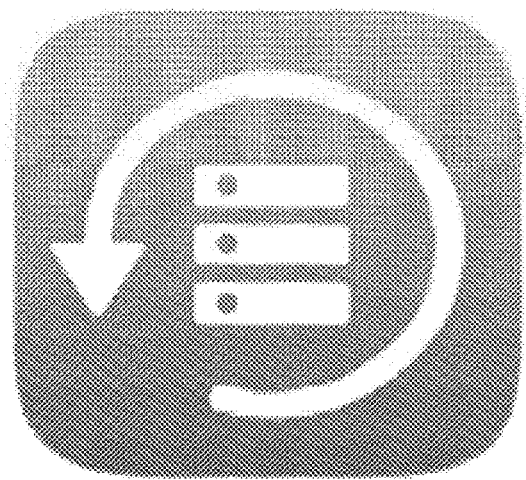
Figures 2, 4:
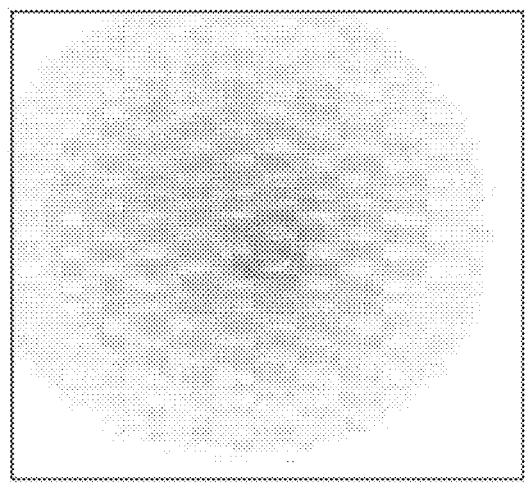
Figures 3, 4:
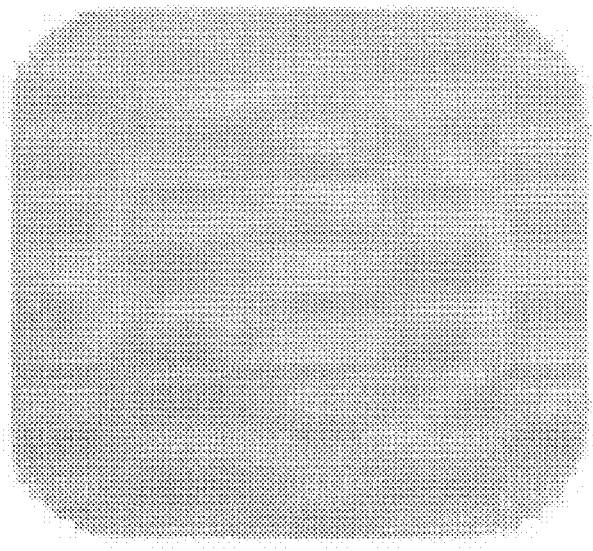
Figure 4:
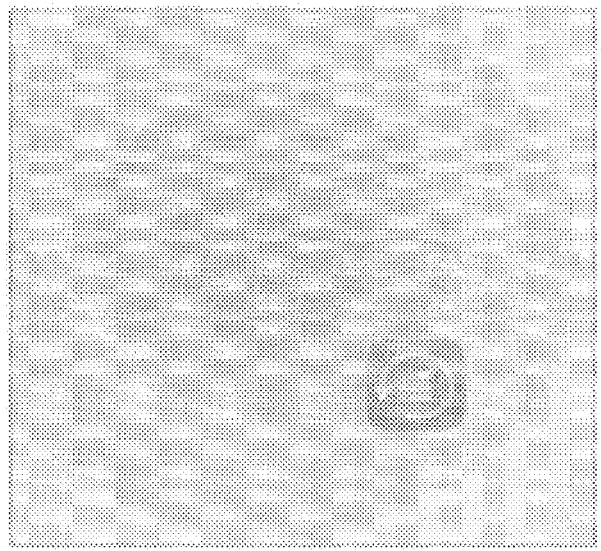
Figures 4, 5:
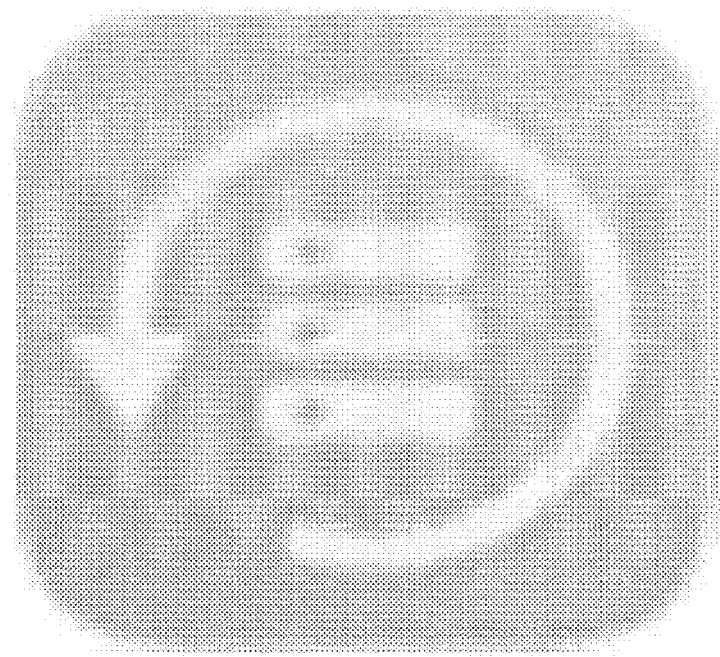
Figures 4, 5, 6:
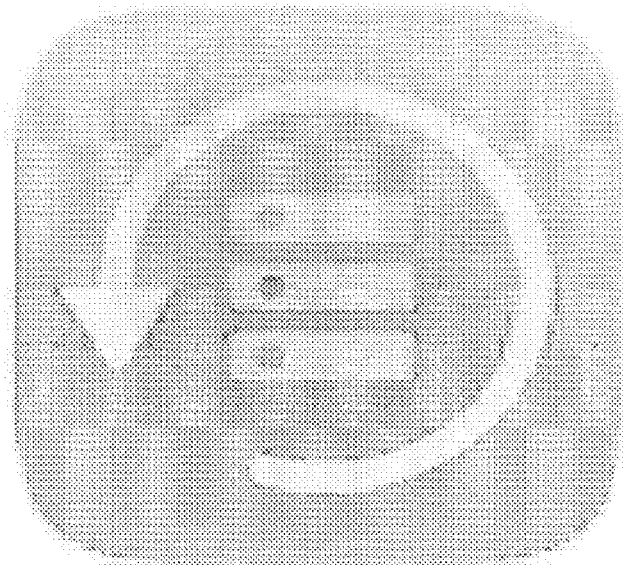
Figures 4, 5, 6, 7:
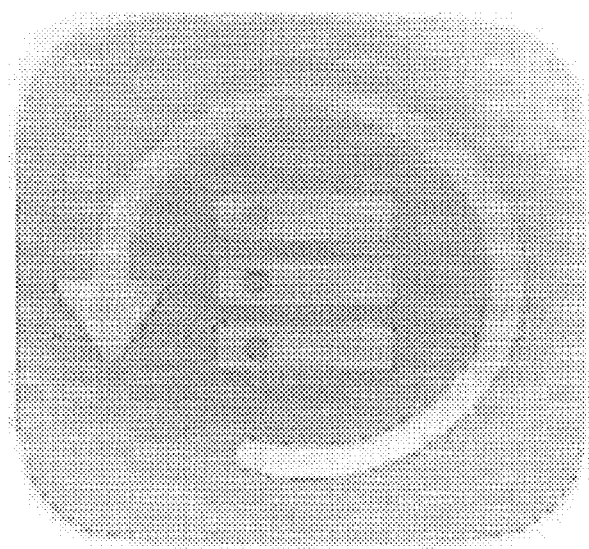
Figures 1, 5:
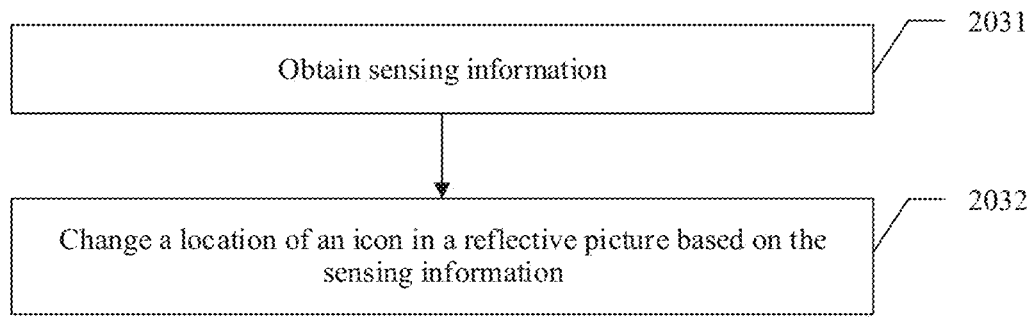
Figures 2, 5:
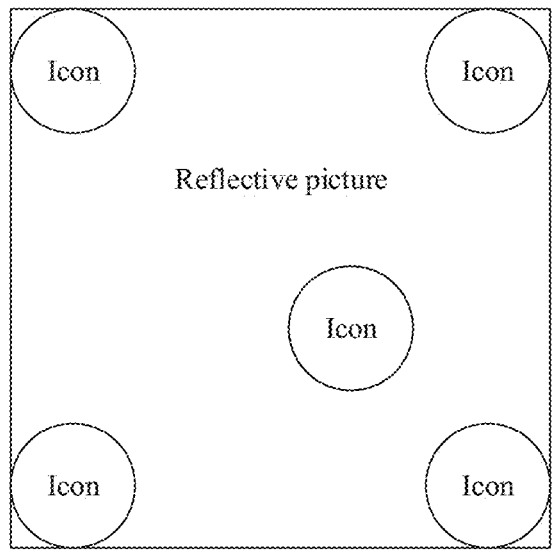
Figures 1, 6:
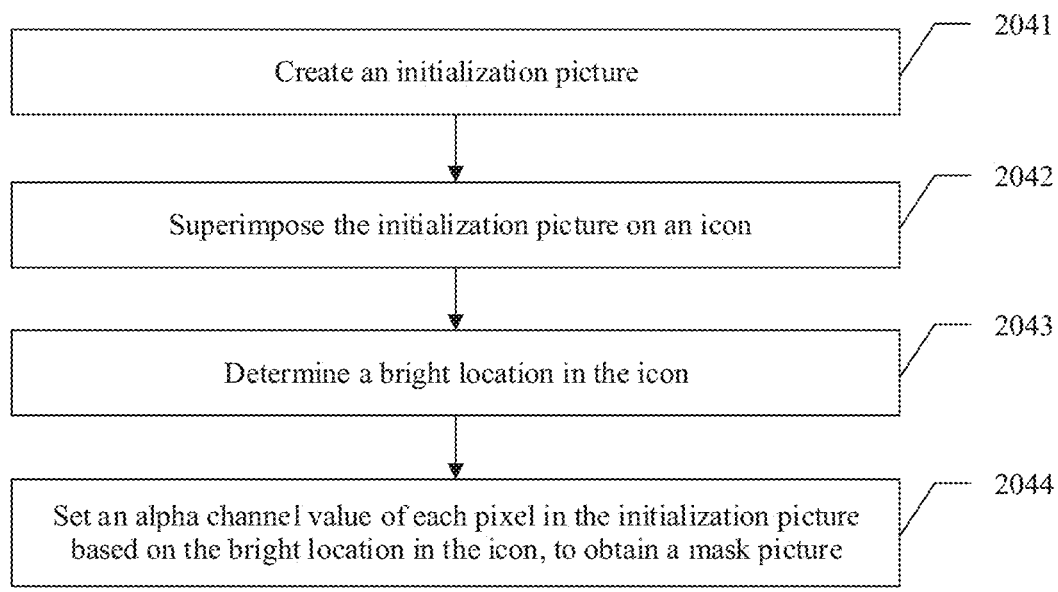
Figures 2, 6:
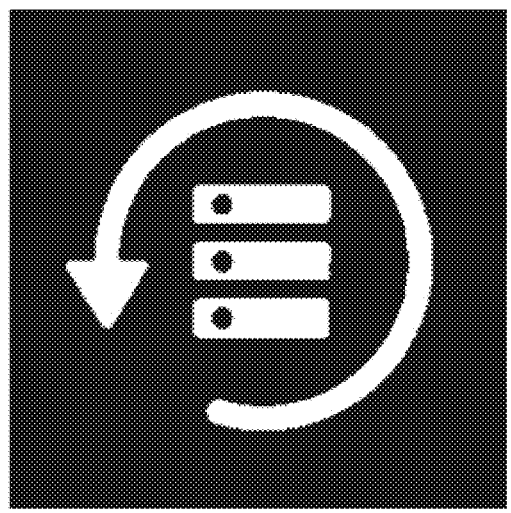
Figures 3, 6:
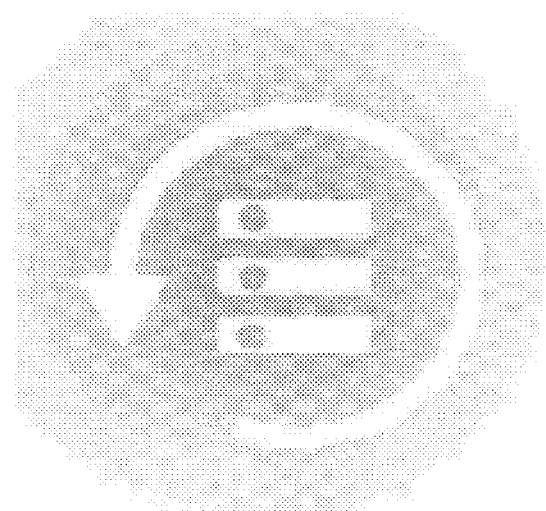
Figures 4, 6:
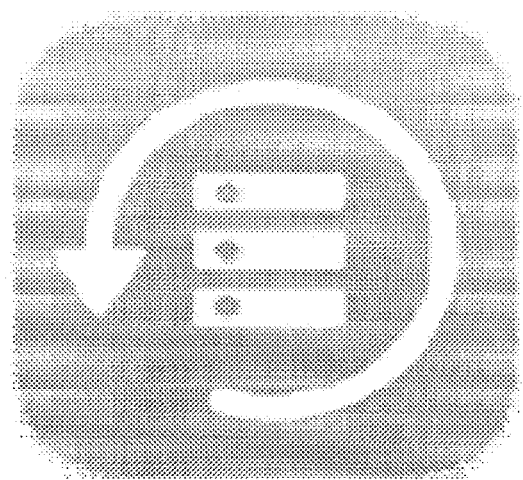
Figure 7:
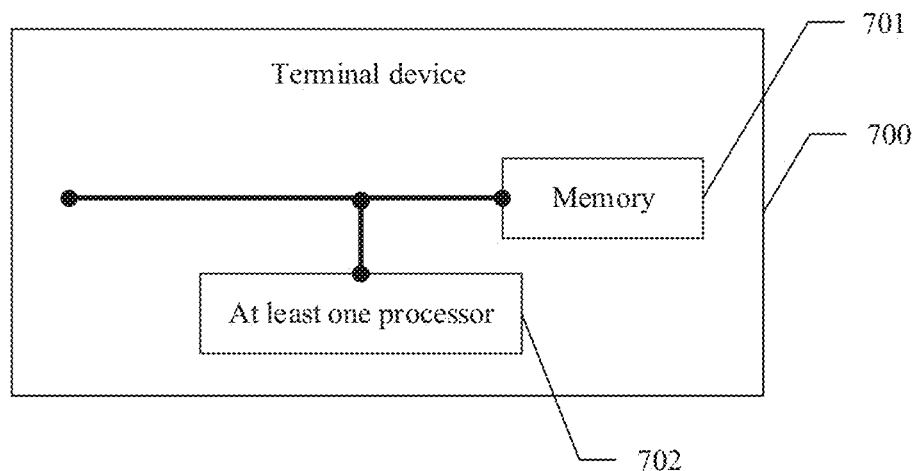

Referring to FIG. 7, this application provides an image processing terminal device 700, including:

a memory 701 and at least one processor 702.

The memory 701 is configured to store computer-readable instructions.

The processor 702 is configured to execute the computer-readable instructions in the memory, to perform the following operations:

obtaining a reflective picture, superimposing the reflective picture on an icon, and changing a color value of at least one pixel in a part that is of the reflective picture and that overlaps the icon.

In some possible implementations, the terminal device 700 for obtaining a reflective picture includes:

creating a fully transparent picture, setting at least one target point in the fully transparent picture, setting a color value of the at least one target point, and determining a color value of a remaining pixel in the fully transparent picture based on the color value of the at least one target point.

In some possible implementations, the determining a color value of a remaining pixel in the fully transparent picture based on the color value of the at least one target point includes:

dividing the fully transparent picture into a plurality of triangles by using the at least one target point, and for any point G in the fully transparent picture, calculating a color value of the point G based on color values of three points of a triangle in which the point G is located.

In some possible implementations, the calculating a color value of the point G based on color values of three points of a triangle in which the point G is located includes: separately connecting the point G to the three points of the triangle, to divide the triangle into three parts, and calculating the color value of the point G according to the following formula: G=C1×g1/g+C2×g2/g+C3×g3/g, where G represents the color value of the point G, g1, g2, and g3 respectively represent areas of the three parts of the triangle, and g represents an area of the triangle.

In some possible implementations, both an edge of the reflective picture and an edge of the icon are rectangular, and a length and a width of the edge of the reflective picture are respectively greater than a length and a width of the edge of the icon.

In some possible implementations, the changing a color value of at least one pixel in a part that is of the reflective picture and that overlaps the icon includes: changing a location of the icon in the reflective icon.

In some possible implementations, the at least one processor 702 is further configured to obtain sensing information. The changing a location of the icon in the reflective icon includes: determining the location of the icon in the reflective icon based on the sensing information.

In some possible implementations, the obtaining sensing information includes: obtaining an angle between the terminal device and a horizontal direction by using a gyroscope, and performing normalization processing on the angle to obtain a normalized value ranging from 0 to 1.

The determining the location of the icon in the reflective icon based on the sensing information includes: determining the location of the icon in the reflective icon based on the normalized value.

In some possible implementations, after the changing a color value of at least one pixel in a part that is of the reflective picture and that overlaps the icon, the following operations are further performed: obtaining a mask picture, and performing image processing on the reflective picture by using the mask picture. In some possible implementations, the obtaining a mask picture includes: creating an initialization picture, superimposing the initialization picture on the icon, determining a bright location in the icon, and setting an alpha channel value of each pixel in the initialization picture based on the bright location in the icon, to obtain the mask picture.

In some possible implementations, the setting an alpha channel value of each pixel in the initialization picture based on the bright location in the icon includes: setting an alpha channel value of a location that is in the initialization picture and that corresponds to the bright location in the icon to 0, and setting an alpha channel value of a remaining location to 1.

In some possible implementations, the performing image processing on the reflective picture by using the mask picture includes: performing image processing on the reflective picture according to the following formula by using the mask picture: temp.rgba=reflective picture.rgba×mask.a, where temp.rgba is a color value of a pixel in the reflective picture after image processing is performed, reflective picture.rgba is a color value of the pixel in the reflective picture before image processing is performed, and mask.a is an alpha channel value of a location that is in the mask picture and that corresponds to the pixel in the reflective picture.

All or some of the foregoing embodiments may be implemented by using software, hardware, firmware, or any combination thereof. When the software is used to implement the embodiments, all or some of the foregoing embodiments may be implemented in a form of a computer program product.

The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An image processing terminal device, comprising:
   a memory configured to store computer-readable instructions; and
   at least one processor coupled to the memory and configured to execute the computer-readable instructions to cause the image processing terminal device to:
   obtain a reflective picture at least in part by:

creating a fully transparent picture;
setting at least one target point in the fully transparent picture;
setting a color value of the at least one target point; and
determining a color value of a remaining pixel in the fully transparent picture based on the color value of the at least one target point;
superimpose the reflective picture on an icon; and
change a color value of at least one pixel in a part of the reflective picture that overlaps the icon.

2. The image processing terminal device of claim 1, wherein the at least one processor is further configured to cause the image processing terminal device to:
divide the fully transparent picture into a plurality of triangles using the at least one target point; and
calculate, for any point G in the fully transparent picture, a color value of the point G based on color values of three points of a triangle in which the point G is located.

3. The image processing terminal device of claim 2, wherein the at least one processor is further configured to cause the image processing terminal device to:
separately connect the point G to the three points of the triangle to divide the triangle into three parts; and
calculate the color value of the point G according to the following formula:

$$G = C1 \times g1/g + C2 \times g2/g + C3 \times g3/g,$$

wherein G represents the color value of the point G, wherein g1, g2, and g3 respectively represent areas of the three parts of the triangle, and wherein g represents an area of the triangle.

4. The image processing terminal device of claim 1, wherein both an edge of the reflective picture and an edge of the icon are rectangular, and wherein a length and a width of the edge of the reflective picture are respectively greater than a length and a width of the edge of the icon.

5. The image processing terminal device of claim 4, wherein the at least one processor is further configured to cause the image processing terminal device to change a location of the icon in the reflective picture.

6. The image processing terminal device of claim 5, wherein the at least one processor is further configured to cause the image processing terminal device to:
obtain sensing information; and
determine the location of the icon in the reflective picture based on the sensing information.

7. The image processing terminal device of claim 6, wherein the at least one processor is further configured to cause the image processing terminal device to:
obtain an angle between the image processing terminal device and a first direction using a gyroscope;
perform normalization processing on the angle to obtain a normalized value ranging from zero to one; and
determine the location of the icon in the reflective picture based on the normalized value.

8. The image processing terminal device of claim 1, wherein after changing the color value of the at least one pixel, the at least one processor is further configured to cause the image processing terminal device to:
obtain a mask picture; and
perform image processing on the reflective picture using the mask picture.

9. The image processing terminal device of claim 8, wherein the at least one processor is further configured to cause the image processing terminal device to:
create an initialization picture;
superimpose the initialization picture on the icon;
determine a bright location in the icon; and
set an alpha channel value of each pixel in the initialization picture based on the bright location in the icon to obtain the mask picture.

10. The image processing terminal device of claim 9, wherein the at least one processor is further configured to cause the image processing terminal device to:
set an alpha channel value of a location in the initialization picture that corresponds to the bright location in the icon to zero; and
set an alpha channel value of a remaining location to one.

11. The image processing terminal device of claim 10, wherein the at least one processor is further configured to cause the image processing terminal device to:
perform image processing on the reflective picture using the mask picture and according to the following formula:

$$temp.rgba = \text{reflective picture}.rgba \times mask.a,$$

wherein temp.rgba is a color value of a pixel in the reflective picture after image processing is performed, wherein reflective picture.rgba is a color value of the pixel in the reflective picture before image processing is performed, and wherein mask.a is an alpha channel value of a location in the mask picture that corresponds to the pixel in the reflective picture.

12. An image processing method, comprising:
obtaining a reflective picture at least in part by:
creating a fully transparent picture;
setting at least one target point in the fully transparent picture;
setting a color value of the at least one target point; and
determining a color value of a remaining pixel in the fully transparent picture based on the color value of the at least one target point;
superimposing the reflective picture on an icon; and
changing a color value of at least one pixel in a part of the reflective picture that overlaps the icon.

13. The image processing method of claim 12, wherein the reflective picture is a semitransparent picture.

14. The image processing method of claim 12, further comprising:
dividing the fully transparent picture into a plurality of triangles using the at least one target point; and
calculating, for any point G in the fully transparent picture, a color value of the point G based on color values of three points of a triangle in which the point G is located.

15. The image processing method of claim 14, further comprising:
separately connecting the point G to the three points of the triangle to divide the triangle into three parts; and
calculating the color value of the point G according to the following formula:

$$G = C1 \times g1/g + C2 \times g2/g + C3 \times g3/g,$$

wherein G represents the color value of the point G, wherein g1, g2, and g3 respectively represent areas of the three parts of the triangle, and wherein g represents an area of the triangle.

16. The image processing method of claim 12, wherein both an edge of the reflective picture and an edge of the icon are rectangular, and wherein a length and a width of the edge of the reflective picture are respectively greater than a length and a width of the edge of the icon.

17. The image processing method of claim 16, further comprising changing a location of the icon in the reflective picture.

18. The image processing method of claim 17, wherein before the changing a location of the icon in the reflective picture, the image processing method further comprises:
   obtaining sensing information; and
   determining the location of the icon in the reflective picture based on the sensing information.

* * * * *